United States Patent [19]

Hayes

[11] Patent Number: 4,863,494
[45] Date of Patent: Sep. 5, 1989

[54] AIR PURIFICATION APPARATUS INCLUDING HIGH TEMPERATURE REGENERATED ADSORBENT PARTICLES

[76] Inventor: William V. Hayes, P.O. Box 1674, Banvera, Tex. 78003

[21] Appl. No.: 265,269

[22] Filed: Oct. 31, 1988

[51] Int. Cl.$^4$ .............................................. B01D 53/04
[52] U.S. Cl. ............................................. 55/59; 55/74; 55/387
[58] Field of Search ....................... 55/59, 68, 74, 387

[56] References Cited

U.S. PATENT DOCUMENTS

| | | | |
|---|---|---|---|
| 3,659,400 | 5/1972 | Kester | 55/68 X |
| 3,727,379 | 4/1973 | Bijleveld et al. | 55/73 |
| 3,780,500 | 12/1973 | Clemens et al. | 55/74 X |
| 3,798,876 | 3/1974 | Kennedy | 55/59 |
| 3,816,355 | 6/1974 | Clemens | 55/74 X |
| 4,063,912 | 12/1977 | Neely et al. | 55/74 |
| 4,239,508 | 12/1980 | Rock et al. | 55/59 |
| 4,675,309 | 6/1987 | Hirai et al. | 55/74 X |

FOREIGN PATENT DOCUMENTS

| | | | |
|---|---|---|---|
| 50-096480 | 7/1975 | Japan | 55/387 |

*Primary Examiner*—Robert Spitzer

[57] ABSTRACT

This disclosure is directed to an air purification bead for removing volatile organic compounds. The preferred form is a divinylbenzene spherical bead sized to pass a 20 mesh to 50 mesh screen. It is formed of not more than 30% and preferable less of divinylbenzene polymer, the median pore diameter being typically in the range of about 40 to 55 angstroms, and the pore volume ranging from about 1.8 to about 2.24 cc/g. The spheres can be treated with a heated purge medium with temperatures up to about 290° C.

5 Claims, No Drawings

AIR PURIFICATION APPARATUS INCLUDING HIGH TEMPERATURE REGENERATED ADSORBENT PARTICLES

BACKGROUND OF THE DISCLOSURE

The present disclosure is directed to an air purification apparatus and more particularly to a particle made in a special fashion as discussed below capable of removing volatile organic compounds from the air, and is further capable of subsequent regeneration and repetitive recycling. The present apparatus is directed to a particle which is primarily particulate divinylbenzene (DVB hereinafter). In the preferred form, substantially pure DVB is formed into particles providing a fairly large surface area, upward of 750 or 800 m$^2$/g and has a pore volume in the range of about 2.24 cc/g. It tolerates an upper operating temperature above 250° C. even as much as 290° C. It is structurally stable notwithstanding the fact that it is in excess of 70% pores and yet is able to be regenerated on exposure to heated fluids which remove the adsorbed materials. Heated fluids such as $N_2$, $CO_2$, and the like can be used to purge adsorbed volatile organic compounds (VOC hereinafter). To obtain these benefits, beads of DVB are made and screened to select beads having a size able to pass through the range of screens of about 20 to about 50 mesh. The beads are preferable spherical. They are typically only about 30% or slightly less in material and the remainder of the bead is pores or cavities within the spherical bead.

Known references having a bearing on the present disclosure include U.S. Pat. No. 3,727,379 which is directed to a polymer system including DVB and styrene and which yields a surface area which is markedly lower, typically about 100 m$^2$/g and which has a very low pore volume, perhaps only one-sixth or one-eighth of the pore volume of the present disclosure. That disclosure sets out a pore volume of 0.3 cc/g. That disclosure has a limited operating temperature range not listed specifically, but which is inferentially markedly less than the temperature range permitted in operation by the present apparatus. It is noted that the styrene constitutes 20% to 98% of the material of that disclosure. Another reference is U.S. Pat. No. 4,239,508 which is a cumene adsorbent material of DVB, ethylvinylbenzene, styrene or mixtures thereof. The '508 disclosure is substantially silent as to details of the particles. For instance, it is not recited whether or not the material in that reference is porous, and if it has pores, pore size is not given. It is merely described as a cumene adsorbent material.

The present disclosure is believed to be an unobvious advance over the materials of the two references, and is further able to be used in a high temperature regeneration system for the DVB material for purification of VOCs. Advantages and benefits of the present material and the method of use thereof are set forth below.

This disclosure is directed to a DVB material useful in vapor recovery. It is particularly useful in removing VOCs from air or other atmospheres. Examples of such materials include gasoline, benzene, typical chlorinated solvents, various alcohols, esters, acid gases and the like. In the preferred form, the present material is substantially pure DVB. By this term, references made to DVB beads which has been processed at the time of manufacture and is intended to be substantially free of trace constituents. In fairness to the process of manufacturing, there may be traces of catalyst in the material, but for all practical purposes, such foreign constituents are substantially nil. Moreover, the present disclosure is directed to a DVB which is in particle form, typically passing through screens of about 20 mesh to about 50 mesh, U.S. standard. The beads are generally spherical and are substantially open cavities or pores. The beads are in the range of about 30% material and 70% pore, the maximum being about 72% or even 75% pores. The remainder of the material is DVB. It is desirable that the product have a pore volume of at least 1.8 cc/g typically up to about 2.4 cc/g. The preferred embodiment is around 2.24 cc/g. The pores are as small as 0.04 microns; indeed defining a typical pore size at that diameter suggests that there will be number of pores which are somewhat smaller as well as those which are larger.

The unobvious bead of the present disclosure is generally inert, generally spherical, and provides a maximum surface area in the range of about 700, and as much as 800 m$^2$/g. This surface area partially defines the aforementioned pore volume of up to about 2.4 cc/g for the product. Moreover, it is made to withstand an actual operating temperature of 290° C.; that is, it can be exposed to a purging step in which purging material is flowed in, through and around a bed of such beads to remove adsorbed materials. At a few degrees above this upper cut off temperature, the beads become tacky and will ultimately melt. When tacky, they may well loose their desired spherical shape, and deformation may also change the density of the product. The round beads (up to about 28% solid material and 72% pores) yields beads in quantity having a collective density described below.

The beads (in response to testing for physical characteristics) range from a large pore diameter of about 242 angstroms to a median pore diameter of about 55 angstroms, with a number of pores as low as 40 angstroms. This yields an apparent density of 0.331 g/mL. Approximately two thirds of the pores lie in the range of about 30 to 95 angstroms diameter. The remaining one third is outside this range and is typically distributed toward the larger pores, not toward the smaller end of that range.

The present apparatus is used in the following manner. A filtration bed is defined structurally by use of a container which is filled with beads formed in accordance with the present disclosure. Such beads have the characteristics described above. This bed is placed in an air flow path which is burdened with the VOC to be removed. The normal operating condition is at room temperature although filtration can be accomplished at elevated temperatures. The temperatures can be elevated above ambient temperature so long as the filtration process continues without damage to the beads, and moreover, collects the VOC onto the surface area of the beads. Recall that the beads have substantial surface area. The VOC removal utilizes substantially all the bead surface which is exposed to the fluid flow. Consider as an example removal of gasoline fumes from an air stream. In that instance, the air flow is introduced into the fluid bed and the gasoline is permitted to collect on the surface of the beads. After a long interval, the bead surface area will be substantially covered with gasoline, and the efficiency of removal then decreases. When this occurs, the bed in taken out of service and is thereafter regenerated by purging. One procedure for purging is to introduce a flow of heated nitrogen or $CO_2$ through the bed. The heated fluid is heated to a temperature even as high as 290° C. This air flow picks up the volatile adsorbed materials in the fluid bed and carries them away. The purge can be continued for an interval sufficient to remove undesired materials from the fluid bed, in particular, to recover the gasoline which was the primary volatile organic compound of interest. Indeed, if the fluid bed is sufficient in size and if the requirements for recycling are such that the fluid bed is purified time and again, a substantial quantity of VOC can be recovered and in this instance, has the form of a valuable by-product. This process is continued until the purging has substantially swept away all of the adsorbed materials in the DVB spheres.

The present system is particularly useful with airborne streams to prevent discharge to atmosphere of the VOCs which are carried by the air stream. It is a matter of scale to define the fluid bed by volume of DVB beads. The beads are introduced into the fluid bed in a virgin state prior to use. The beads are individual, and merely contact one another but are free of one another, and are not exposed to temperatures which would make them otherwise tacky, causing sticking between beads.

The present apparatus thus enables practice of the method which is described in the example above. The purification (at the time the adsorbed materials are removed) can be practiced at temperatures up to about 290° C. Regeneration at the higher temperature substantially speeds up regeneration in contrast with lower temperatures purging.

While the foregoing is directed to the preferred embodiment, the scope thereof is determined by the claims which follows:

What is claimed is:

1. A method of filtering volatile organic compounds from an air stream wherein the method comprises the steps of:

(a) forming a fluid bed of beads of substantially pure DVB wherein the beads have a surface area of about 700 $m^2/g$ or greater, a pore volume in the range of about 1.8 to about 2.24 cc/g, at least 72% pores wherein more than half the pores are in the range of about 30 to about 95 angstroms;
    (b) directing a volatile organic compound in fluid flow through said bed while organic compounds are adsorbed out of the fluid flow; and
    (c) periodically regenerating the fluid bed by passing a purged fluid therethrough at temperatures elevated above ambient temperature but limited to not more than about 290° C.

2. A purification product for use with air streams conducting volatile organic compounds comprising a bed of DVB beads having a surface area in excess of about 700 $m^2/g$, a pore volume in excess of about 1.8 cc/g wherein the beads comprise about 30% or less material and the remainder is pore volume, wherein the beads are individual beads and remain untacky at temperatures of up to about 290° C. and have pore diameters including the range of about 40 to about 55 angstroms.

3. The apparatus of claim 2 wherein the beads have approximately two thirds of the pore volume distributed in a range of about 30 to about 95 angstroms pore diameter.

4. The beads described in claim 3 further wherein said beads are at least 72% pore volume and less than 28% solid material and the surface area is about 800 $m^2/g$ and are comprised on substantially pure DVB.

5. The apparatus of claim 4 wherein said beads are generally spherical and have a diameter able to pass through screens of about 20 to about 50 mesh, U.S. Standard.

* * * * *